US 6,548,918 B1

(12) United States Patent
Baalmann et al.

(10) Patent No.: US 6,548,918 B1
(45) Date of Patent: Apr. 15, 2003

(54) LINEAR GUIDE

(75) Inventors: Klaus Baalmann, Wiesbach (DE);
Peter Lutz, Miesenbach (DE); Roland Ruffing, Bexbach (DE); Dietmar Rudy, Kaiserslautern (DE)

(73) Assignee: Ina Walzlager Schaeffler oHG (DE)

( * ) Notice: Subject to any disclaimer, the term of this patent is extended or adjusted under 35 U.S.C. 154(b) by 0 days.

(21) Appl. No.: 09/787,468

(22) PCT Filed: Sep. 9, 1999

(86) PCT No.: PCT/EP99/06633

§ 371 (c)(1),
(2), (4) Date: Apr. 17, 2001

(87) PCT Pub. No.: WO00/16468

PCT Pub. Date: Mar. 23, 2000

(30) Foreign Application Priority Data

Sep. 16, 1998 (DE) .......................... 198 42 384

(51) Int. Cl.[7] ................................ H02K 41/00
(52) U.S. Cl. .................................... 310/12
(58) Field of Search ..................... 310/12, 13, 14

(56) References Cited

U.S. PATENT DOCUMENTS

| 4,351,628 A | * | 9/1982 | Drexel et al. ........... 414/749.1 |
| 4,641,065 A | | 2/1987 | Shibuki et al. ............. 318/135 |
| 5,073,734 A | | 12/1991 | Combette .................. 310/65 |
| 5,598,043 A | | 1/1997 | Hirano et al. ............... 310/12 |
| 5,668,421 A | | 9/1997 | Gladish ..................... 310/12 |
| 6,023,111 A | * | 2/2000 | Noda et al. ................. 310/12 |

FOREIGN PATENT DOCUMENTS

| DE | 19547686 | | 6/1997 |
| DE | 29718566 | | 1/1998 |
| FR | 2704993 | | 11/1994 |
| JP | 02-220964 A | * | 9/1990 |
| WO | PCT/EP9906633 | | 9/1999 |

OTHER PUBLICATIONS

Translation of 2704993 French Patent.*

* cited by examiner

Primary Examiner—Nestor Ramirez
Assistant Examiner—Judson H. Jones
(74) Attorney, Agent, or Firm—Muserlian, Lucas and Mercanti

(57) ABSTRACT

In a linear guide comprising a guide housing (1, 16) configured as a profiled support, and at least one guide rail (2) fixed therein, a guide carriage (3) being supported for longitudinal displacement on the guide rail (2) while being connected to a running carriage (5, 17) that is situated partly outside the housing (1, 16) and extends through a longitudinal opening (7, 8, 18, 19) into the housing (1, 16), the linear guide comprising within the housing (1, 16), a drive for the longitudinal displacement of the guide carriage (3) and of the running carriage (5, 17), according to the invention, the guide housing (1, 16) is an extrusion molded profile made of aluminium and the drive is configured as an electromotor with one motor component arranged in the guide housing (1, 16) and one motor component arranged in the running carriage (5, 17).

7 Claims, 1 Drawing Sheet

LINEAR GUIDE

FIELD OF THE INVENTION

The invention concerns a linear guide comprising a guide housing configured as a profiled support that is an extrusion molded profile made of aluminium, and at least one guide rail fixed therein, one or more guide carriages being supported for longitudinal displacement on the guide rail while being connected to a running carriage that is situated partly outside the housing and extends through a longitudinal opening into the housing, the linear guide comprising within the housing, a drive for the longitudinal displacement of the guide carriage and of the running carriage, said drive being configured as an electromotor with one motor component arranged in the guide housing and one motor component arranged in the running carriage.

BACKGROUND OF THE INVENTION

Driven linear guides have been hitherto used mainly in the field of handling. New markets and uses open up, above all, when there is a demand for high displacement dynamics coupled with high positioning exactitude (overshoot-free positioning), simple mounting in existing structures or structural profiles, or for cantilevered installation. A ball screw drive does indeed achieve the required positioning exactitude but compared to a belt-driven linear guide, the achievable speed of the running carriage is limited to low values due to the limit rotational speed of the bearing and the critical speed of rotation of the spindle that is strongly length-dependent.

Conversely, with belt-driven linear guides, high speeds of displacement are achieved but only a poor positioning exactitude. The drawback of the low rigidity of this drive concept compared to a ball screw drive becomes apparent at high acceleration and a great number of cycles. This manifests itself in an overshooting of the targeted position by the running carriage.

A linear guide unit is known from the document DE 196 36 270 A1. For displacing the running carriage on the guide rail in the longitudinal direction thereof, this linear guide possesses a pneumatic linear drive that surrounds a cylinder space of elliptical cross-section arranged in a bottom wall of the guide housing. A piston is guided in this space and each of its two ends is connected to one side of the drive. Each side of the drive leads through a deflecting roller to one end of the running carriage. A differing air pressure loading of the working chambers on either side of the piston results in a displacement of the piston and thus in a displacement of the running carriage in the opposite direction. The drawback of such a linear guide equipped with a pneumatic drive is its very complex structure.

The document FR 2 704 993 shows a linear guide equipped with an electric linear drive in whose profiled support made, for example, of aluminium, several driven carriages that are mechanically independent of each other can roll through rollers on one common rail. The rail is integrally formed on the profiled support. A carriage configured as a vertical plate extends through aligned slots of the rail and of the profiled support to the outside. On the ends of the running carriage situated on the outside, it is possible, for instance, to hang curtains or sliding doors that have to be moved. Measures for closing the free regions of the slots of the profiled support that are situated between the successive carriages are not provided in this linear guide.

SUMMARY OF THE INVENTION

The object of the invention is to create a compact linear bearing of a simple structure that can be economically manufactured.

The invention achieves this object by the fact that the longitudinal opening is closed by a cover strip made of anti-corrosive magnetic steel for which permanent magnet strips are inserted into grooves of the guide housing. By the use of an extrusion molded aluminium profile as a guide housing, a combination of a driven linear guide unit with a weight-optimized, inherently rigid support profile is obtained.

The primary motor component may be arranged in the running carriage and the secondary motor component in the guide housing. The longitudinal opening can be closed by a cover strip of anti-corrosive magnetic steel for which permanent magnet strips can be inserted into grooves of the guide housing.

Besides a drawn support profile of aluminium with one or more integrated profiled rails, the linear guide of the invention may contain the following components: a length measuring system, one or more running carriages with guide carriages, a drive in the form of a linear motor surrounded by the support profile, two end plates and a cover in the form of a corrosion-resistant steel strip.

BRIEF DESCRIPTION OF THE DRAWINGS

Examples of embodiment of the invention are represented in the drawings and will be described more closely in the following.

DETAILED DESCRIPTION OF THE DRAWINGS

Figure 1:
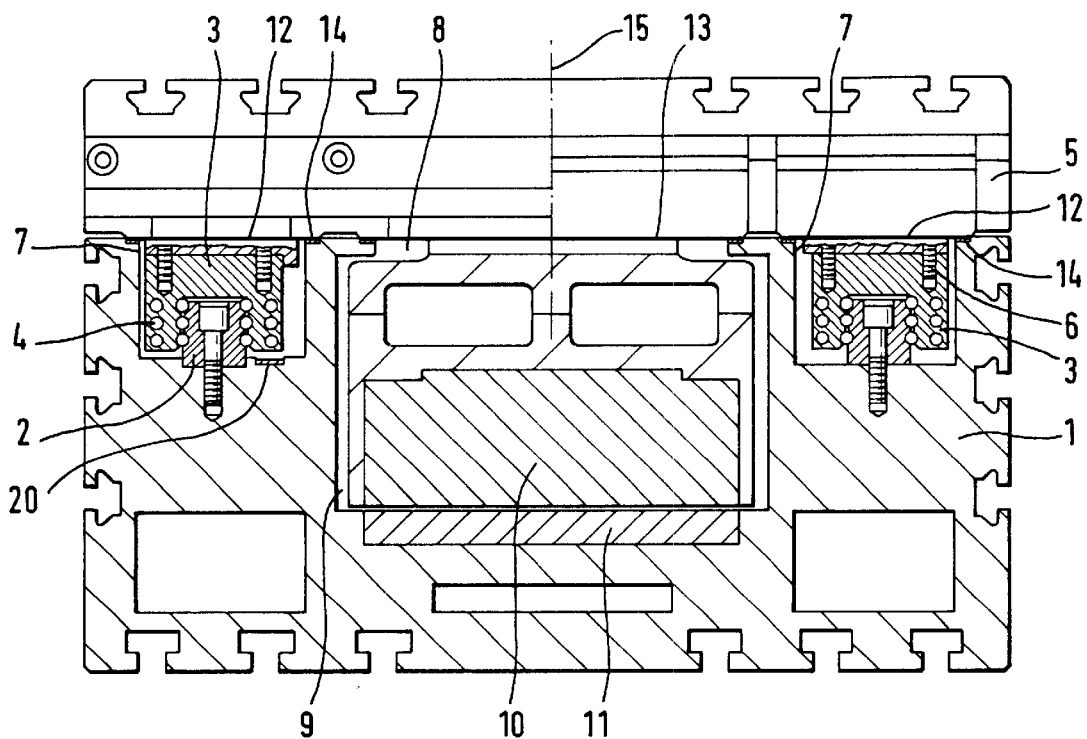
FIG. 1 is a cross-section through a linear guide unit having two guide rails arranged at the same height for two guide carriages carrying one running carriage.

A linear guide according to the invention illustrated in FIG. 1 comprises a guide housing 1 that is approximately U-shaped in cross-section and is made as an aluminium profiled support (aluminium extrusion molded profile). Two parallel guide rails 2 are fixed in this housing and at least one guide carriage 3 is supported through ball circuits 4 on each guide rail 2. With the help of the load-bearing balls of these ball circuits 4, the guide carriages 3 can be displaced along the guide rails 2.

The guide carriages 3 serve to displaceably mount a running carriage 5 that is secured by screws 6 on the guide rail-distal top surfaces of the guide carriages 3. The running carriage 5 is situated on the outside of the guide housing 1 and extends through two longitudinal side openings 7 and one longitudinal central opening 8 into the guide housing 1 for connection to the guide carriages 3 and for connection, in a central reception space 9 of the guide housing 1, to a primary motor component 10 of a drive. Opposite the primary motor component 10 that is fixed on the running carriage 5 is situated a secondary motor component 11 that is fixed in the guide housing 1. These two components constitute an electric drive motor for the displacement of the running carriage 5 in the longitudinal direction of the guide housing 1.

Outside of the running carriage 5, each of the longitudinal side openings 7 is closed with a cover strip 12 while for the central longitudinal opening 8, a cover strip 13 is provided. The cover strips 12 and 13 are inserted through slot-like openings of the running carriage 5 and are fixed in the longitudinal direction of the guide rail on the guide housing 1 so that, when the running carriage 5 is displaced in the longitudinal direction of the guide housing 1, it executes a relative movement with regard to the cover strips 12 and 13. Outside of the running carriage 5, the cover strips 12 and 13 are retained on the guide housing 1 with the help of permanent magnet strips 14 that are arranged in longitudinal grooves of the guide housing 1. The linear guide according to FIG. 1 has a symmetric configuration with respect to a vertical central plane 15.

Figure 2:
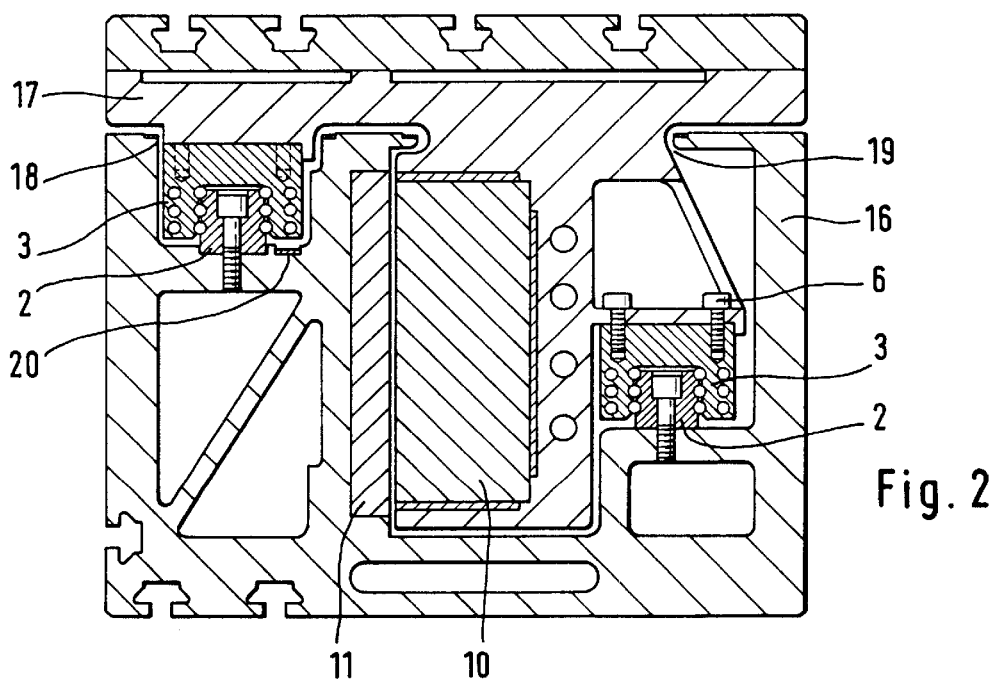
FIG. 2 is a cross-section through a linear guide that is narrower than the linear guide of FIG. 1 and in which, to save design space, the two guide rails are arranged at different heights.

The linear guide according to FIG. 2 has basically the same structure except that the primary motor component 10 and the secondary motor component 11 are not arranged in a horizontal position but in a vertical position within the guide housing 16. This results in an economy of design space in the linear guide in width direction. The guide housing 16 and the running carriage 17 of this embodiment do not have a symmetrical configuration and the guide rails 2 with the guide carriages 3 arranged in the side regions of the guide housing 16 are situated at different heights. In this embodiment, only two longitudinal openings 18 and 19 of the housing are required to enable a connection of the guide carriages 3 to the running carriage 17 which is situated substantially outside the guide housing 16. In this case too, screws 6 are used for fixing the individual elements to one another, for example, for fixing the guide carriages 3 to the running carriage 17. Both of the linear guides represented in FIGS. 1 and 2 comprise length measuring strips 20 that are disposed within the profile of the guide housings 1 and 16 adjacent the guide carriages and are parallel to the guide rails 2. The running carriage of the linear guide of the invention which is also made of an aluminium extrusion molded profile, and in which the primary motor component is integrated, is guided by a plurality of ball circuit units. Ventilation slots arranged in the running carriage carry away the waste heat of the motor to the atmosphere in the interior of the profile so that the warming-up of the running carriage is kept as low as possible.

The longitudinal openings of the profiled support are closed by anti-corrosive magnetic steel cover strips to prevent the entry of dirt particles. The cover strips are stationary and pass through the running carriage when this travels. In order that the covers are in optimum contact with the extrusion molded profile and do not come off even in an overhead installation, the permanent magnet strips that pull the steel strip to the surface of the profiled support are inserted into appropriate grooves of the profiled support.

The motors in all the embodiments can be asynchronous motors, synchronous motors or reluctance motors and D.C. motors. The essential feature of the solution of the invention is the combination of a driven linear guide unit with a weight-optimized, inherently rigid profiled support that is configured as an aluminium extrusion molded profile and has a drive in the form of a linear motor. Not only the motor but also a length measuring system can be arranged together with the profiled rail guide in the interior of the guide housing wherein all the openings are closed with the help of cover strips so that an optimum protection of all the components from dirt is guaranteed. With this combination, the advantages of a belt-driven linear guide can be coupled with those of a linear guide driven by a ball screw drive.

The advantages of a belt-driven linear guide like high speed and dynamics are thus combined with the advantages of a linear guide with a ball screw drive such as high rigidity of the drive, high exactitude of positioning and repeating accuracy. At the same time, the price of such a linear guide is comparable to that of a guide with a ball screw drive. Due to the T-grooves provided in the profiled support, the profile can be screwed by the user in a simple manner on common commercial structural profiles.

REFERENCE NUMERALS

1 Guide housing
2 Guide rail
3 Guide carriage
4 Ball circuit
5 Running carriage
6 Screw
7 Longitudinal side opening
8 Longitudinal central opening
9 Central reception space
10 Primary motor component
11 Secondary motor component
12 Cover strip
13 Cover strip
14 Permanent magnet strip
15 Central plane
16 Guide housing
17 Running carriage
18 Longitudinal opening
19 Longitudinal opening
20 Length measuring strip

What is claimed is:

1. A linear guide comprising a guide housing (1, 16) configured as a profiled support that is an extrusion molded profile made of aluminium, and at least one guide rail (2) fixed therein, one or more guide carriages (3) being supported for longitudinal displacement on the guide rail (2) while being connected to a running carriage (5, 17) that is situated partly outside the housing (1, 16) and extends through a longitudinal opening (7, 8, 18, 19) into the housing (1, 16), the linear guide comprising within the housing (1, 16), a drive for the longitudinal displacement of the guide carriage (3) and of the running carriage (5, 17), said drive being configured as an electromotor with one motor component arranged in the guide housing (1, 16) and one motor component arranged in the running carriage (5, 17), characterized in that the longitudinal opening (7, 8, 18, 19) is closed by a cover strip (12, 13) made of anti-corrosive magnetic steel for which permanent magnet strips (14) are inserted into grooves of the guide housing (1, 16).

2. A linear guide according to claim 1, characterized in that the primary motor component (10) is arranged in the running carriage (5, 17) and the secondary motor component (11) is arranged in the guide housing (1, 16).

3. A linear guide according to claim 1, characterized in that the running carriage (5, 17) is an extrusion molded profile made of aluminium.

4. A linear guide according to claim 2, characterized in that the connection of the guide carriages (3) to the running cages (5, 17) is effected with the help of screws (6).

5. A linear guide according to claim 1, characterized in that the guide rail (2), the guide carriage (3) and a length measuring system (20) associated thereto as well as the drive are surrounded by the guide carriage (1, 16), and the longitudinal opening (7, 8, 18, 19) is closed by a cover strip (12, 13) acting as a dirt protection.

6. A linear guide according to claim 2, characterized in that the connection of the guide carriages (3) to the running carriage (5, 17) as also the fixing of the primary motor component (10) in the running carriage (5, 17) and of the secondary motor component (11) in the guide housing (1, 16) are effected through a positive engagement, like undercutting, by an appropriate shaping of the extrusion molded profile.

7. A linear guide comprising a guide housing (1, 16) configured as a profiled support that is an extrusion molded profile made of aluminum, and at least one guide rail (2) fixed therein, one or more guide carriages (3) being supported for longitudinal displacement on the guide rail (2) while being connected to a running carriage (5, 17) that is situated partly outside the housing (1, 16) and extends through a longitudinal opening (7, 8, 18, 19) into the housing (1, 16), the linear guide comprising within the housing (1, 16) a drive for the longitudinal displacement of the guide carriage (3) and of the running carriage (5, 17), said drive being configured as an electromotor with one motor component arranged in the guide housing (1, 16) and one motor component arranged in the running carriage (5, 17), characterized in that the longitudinal opening (7, 8, 18, 19) is closed by a cover strip (12, 13) made of anti-corrosive magnetic steel for which permanent magnet strips (14) are inserted into grooves of the guide housing (1, 16), the electromotor is configured as a motor operating after the principle of the synchronous motor, with the primary motor component (10) corresponding to the rotor and the secondary motor component (11) corresponding to the stator, the primary motor component (10) is arranged in the running carriage (5, 17) and the secondary motor component (11) is arranged in the guide housing (1, 16).

\* \* \* \* \*